US007569769B2

(12) United States Patent
Zaleski et al.

(10) Patent No.: US 7,569,769 B2
(45) Date of Patent: Aug. 4, 2009

(54) DAMPER ASSEMBLY STAKING SYSTEM

(75) Inventors: Garry Zaleski, Eastlake, OH (US); John Olenik, Mentor, OH (US)

(73) Assignee: Preformed Line Products Company, Mayfield Village, OH (US)

(*) Notice: Subject to any disclaimer, the term of this patent is extended or adjusted under 35 U.S.C. 154(b) by 77 days.

(21) Appl. No.: 11/695,252

(22) Filed: Apr. 2, 2007

(65) Prior Publication Data
US 2008/0236856 A1 Oct. 2, 2008

(51) Int. Cl.
*H02G 7/14* (2006.01)
(52) U.S. Cl. .................... 174/42; 174/41; 174/128; 174/130; 174/40 CC; 174/40 R; 439/411; 385/135
(58) Field of Classification Search ............ 174/41, 174/42, 128, 130, 146, 40 CC, 40 R, 52.1, 174/135; 439/411; 385/135
See application file for complete search history.

(56) References Cited

U.S. PATENT DOCUMENTS

| 2,976,069 | A | * | 3/1961 | Meredith | ............ 403/16 |
| 3,153,693 | A | | 10/1964 | Baxter et al. | |
| 3,177,542 | A | | 4/1965 | James | |
| 3,885,086 | A | * | 5/1975 | Houston et al. | ........ 174/42 |
| 5,352,003 | A | * | 10/1994 | Bystry | ............ 292/323 |
| 6,840,016 | B1 | | 1/2005 | Mualla | |
| 6,943,290 | B2 | * | 9/2005 | Dulhunty | ............ 174/42 |

OTHER PUBLICATIONS

David C. Sunkle, et al. Determination of damping effectiveness of impact damper on ADSScable. pp. 195-201. http://ieeexplore.ieee. org/Xplore/login.jsp?url=/iel5/7089/19099/00882821.pdf. Last accessed Dec. 14, 2007.
D. Brika, et al. Vortex-induced vibrations of a long flexible circular cylinder. http://journals.cambridge.org/action/displayAbstract;jsessionid=7FCE6E6EE35EF4B2CEC1D04999AB2422.tomcat1?fromPage=online&aid=339408. Last accessed Dec. 14, 2007.
Vortx. Vibration Damper for Conductor, Cable, Earth Wires & OPGW. <http://www.preformed.com/artsfest/files/literature/VortxSellSheet.pdf>. Last accessed Dec. 14, 2007.
IEEE guide on the measurement of the performance of aelian vibration dampers for single conductors. Copyright 1980. http://ieeexplore.ieee.org/Xplore/login.jsp?url=/iel1/2557/1097/000277776.pdf&arnumber=27776.
Helix. Aeolian Vibration Damper. pp. http://www.helix-uni.ca/CataloguePDFAnglais/Serie%2085000.pdf. Last accessed Dec. 14, 2007.
Fargo 4-R Dampers. Advance Vibration Protection. http://www.hubbellpowersystems.com/powertest/literature_library/pdfs4lib/Fargo-Fittings/TB-107R3.pdf. Last accessed Dec. 14, 2007.
International Search Report and Written Opinion, dated Sep. 8, 2008 for International Application No. PCT/US/0851474, 10 Pages.

* cited by examiner

*Primary Examiner*—Dhiru R Patel
(74) *Attorney, Agent, or Firm*—James J. Pingor; Driggs, Hogg, Daugherty & Del Zoppo Co. L.P.A (57) ABSTRACT

A damper assembly staking system that provides for staking damper weights onto a messenger is disclosed. The damper assembly includes damper weights having a forked side which accepts a messenger. A hole is drilled in the forked side of the damper weight to receive the messenger. A staking hole is then drilled into the bottom of the damper weights. The staking hole extends just past the side of the messenger hole and is sized to receive a staking ball. Staking of the damper weight is accomplished by pressing the staking ball into the staking hole via a hardened dowel pin to secure the messenger within the damper weights.

19 Claims, 8 Drawing Sheets

DAMPER ASSEMBLY STAKING SYSTEM

BACKGROUND

In the utility industry, transmission lines are used to direct electrical energy from one location to another. These lines are used to transmit the energy over short or long distances as necessary or desired. Further, a vibration damper is a device used for damping overhead power transmission lines. Vibration dampers comprise a pair of weights joined by a stranded steel cable (commonly known as a 'messenger cable') and a clamp attached to the cable at a location intermediate to the weights for attachment to an overhead power transmission cable. The configuration of weights mounted on the ends of the messenger cable is designed to resonate at frequencies determined to be appropriate for the vibration occurring in the transmission line cable. Vibration dampers function by dissipating energy through flexing of the messenger cable.

A typical vibration damper employs a messenger cable comprised of two or more layers of helically wound strands of high tensile steel wire. In the construction of vibration dampers, it is necessary to attach the damper weights securely to the ends of the messenger cable and this is conventionally done in a number of ways, such as: compressing the damper weights onto the messenger cable; using custom-made crimping dies to secure the messenger cable within the damper weights; molding/casting the damper weights onto the ends of the messenger cable; by using a potting metal or epoxy to secure the damper weights onto the ends of the messenger cable; by attaching a tapered collet onto each end of the messenger cable and then inserting the tapered collet into a complementary tapered hole in the damper weight; or passing all of the individual strands of the messenger cable through a hole in the damper weight and subsequently welding all of the strands onto the damper weight.

However, it has been found that an inexpensive and simple manufacturing process is needed, instead of custom-made crimping dies. Further, the quality and hardness of the metal used to make the damper weights should not affect the gripping of the messenger or performance of the damper assembly.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a damper assembly staking system. The damper assembly is clamped directly onto a conductor/cable via a clamp. The damper assembly comprises at least one damper weight with a forked side which accepts a messenger. A hole is drilled in the forked side of the damper weight to receive the messenger. A staking hole is then drilled into the bottom of the damper weights. The staking hole extends just past the bottom edge of the messenger hole and is sized to receive a staking ball. The staking hole in combination with the staking ball act to secure the messenger within the damper weight.

Furthermore, in aspects, damper weights previously secured via collets and crimping can be re-worked by the presently claimed damper assembly staking system. The re-worked damper weights comprise a collet hole for accepting a collet. The collet encompasses the end of a messenger and is then inserted into place. The collet hole of the re-worked damper weights is filled in via a collet plug. A messenger hole for accepting the messenger is then drilled into the collet plug. The depth of the messenger hole matches the collet hole's depth. A staking hole is then added to accept the staking ball. The staking hole extends just past the bottom edge of the messenger hole and is sized to receive the staking ball. Staking of the re-worked damper weights is accomplished by pressing the staking ball into the staking hole via a hardened dowel pin that has a concave end to hold and align the staking ball for insertion. The staking ball and the messenger are compressed together at a suitable force to secure the messenger within the re-worked damper weights.

Additionally, in a specific embodiment, in order to retain the same weight of the original damper weights, 42 grams of metal needs to be removed from the end of the re-worked damper weights. This is done by removing 0.125 inches of material from the top and bottom of the sides of the re-worked damper weights. Thus, re-worked damper weights can be utilized with the subject damper assembly staking system without making any changes to the messenger, clamps or weight placements.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As described supra, the subject damper assembly staking system provides an inexpensive and simple manufacturing process, no special machining is needed. An inexpensive rigid ball (e.g., brass) is used for staking and an inexpensive dowel pin is used instead of custom made crimping dies. Further, the quality and hardness of the metal used to make the damper weights does not affect the gripping of the messenger or performance of the damper assembly. Accordingly, no changes are needed to the current messenger, clamps or weight placements. As such, the subject damper assembly staking system allows for the new damper weights and the previously used damper weights modified in this manner to look and perform alike.

While specific measurements, weights, materials and shapes are described infra, it is to be understood that these examples are provided to add perspective to the innovation and are not intended to limit the scope of this disclosure and claims appended hereto. Accordingly, it is to be understood that alternative embodiments exist and are to be included within the scope of this disclosure. For example, alternative, hole sizes, ball sizes, ball materials, as well as hole placements may be appropriate for alternative applications. These alternatives are to be included herein.

Figure 1:
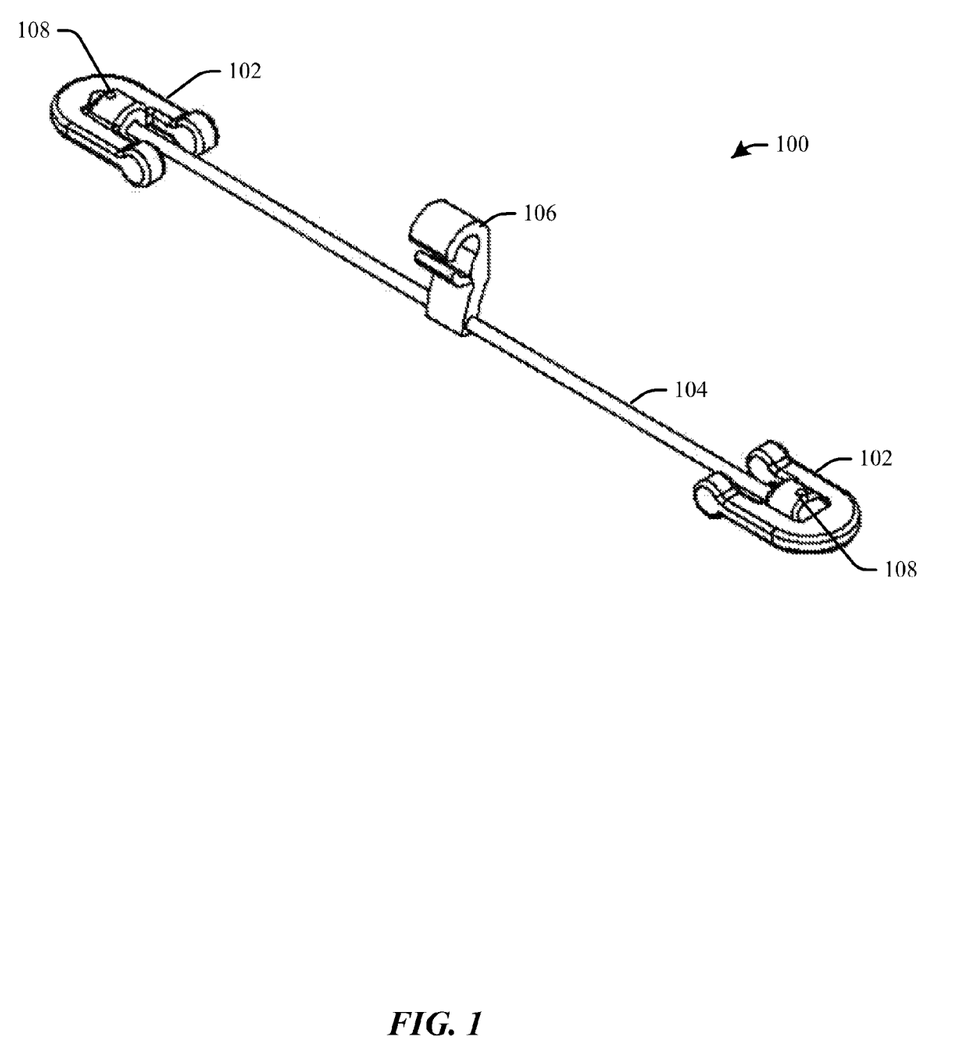
FIG. 1 illustrates a perspective view of a damper assembly in accordance with an aspect of the innovation.

FIG. 1 is a perspective view of a damper assembly 100 for use in the presently claimed damper assembly staking system. The damper assembly 100 responds to wind induced line vibration that is characterized by high frequency, low amplitude motion, (e.g., aeolian vibration). Damper assemblies comprise a pair of damper weights 102 joined by a stranded steel messenger cable 104 and a clamp 106 attached to the messenger cable 104 at a location intermediate the damper weights 102 for attachment to an overhead power transmission conductor/cable (not shown). The configuration of damper weights 102 mounted on the ends of the messenger cable 104 is designed to resonate at frequencies determined to be appropriate for the vibration occurring in the transmission line conductor/cable.

The transmission line conductor/cable is typically an aluminum based conductor such as aluminum conductor steel reinforced (ACSR) conductors, all aluminum conductor (AAC), all aluminum alloy conductors (AAAC), aluminum conductor alloy reinforced (ACAR) conductors, etc. However, other conductors/cables can be used. It is thus to be understood that any suitable conductors/cables are contemplated and intended to fall under the scope of the hereto-appended claims. Typically, the damper assembly 100 is clamped onto the conductor via a clamp 106. The clamp can have an extruded hook shaped profile which hangs on the conductor and a keeper which tightens and secures the conductor. However, the clamp 106 can also be cast, forged or injection molded. Or, the clamp can have two semi-circular halves which tighten and secure the conductor, etc. Thus, the clamp 106 captures and holds the damper assembly 100 firmly onto the conductor. It is thus to be understood that any suitable clamp is contemplated and intended to fall under the scope of the hereto-appended claims.

Furthermore, the damper assembly 100 comprises at least one damper weight 102. Although most often similar in shape, damper weights can vary in size, weight and even shape depending on a particular application or desired performance. As conductors/cables increase in size, the conductors tend to vibrate at lower frequencies. Large damper weights provide damping at lower frequencies and small damper weights provide damping at higher frequencies. Typically, the damper weights are made of galvanized ductile iron casting, but can be made of any suitable material known in the art. In accordance with the aspect of FIG. 1, the damper weights 102 comprise a forked side which accepts a messenger cable 104. However, the damper weights 102 need not be forked and can vary in size and shape. The messenger cable 104 is made of formed hard steel wires that are galvanized for corrosion resistance. However, the messenger cable 104 can also be coated with a mischmetal coating or a bezinal coating as opposed to galvanization. It is thus to be understood that any suitable material is contemplated and intended to fall under the scope of the hereto-appended claims. Movement of the damper weights 102 produces bending of the messenger 104. The bending of the messenger 104 causes the individual wires of the messenger 104 to rub together, thus dissipating energy.

The messenger 104 is secured within the damper weights 102 by a staking ball 108. Specifically, a messenger hole can be drilled (or pre-cast) in the forked side of the damper weight 102. The messenger hole is sized to accept any diameter of messenger 104. The messenger 104 is typically 7.8 mm in diameter, but can be any diameter for transmitting vibrations. A staking hole is then drilled into the damper weights 102. The staking hole extends just past the side of the messenger hole and is sized to receive the staking ball 108. In a particular embodiment, the staking hole is located 0.625 inches from the inner edge of the forked side of the damper weights 102. The staking hole in combination with the staking ball 108 acts to secure the messenger 104 within the damper weights 102.

Figure 2:
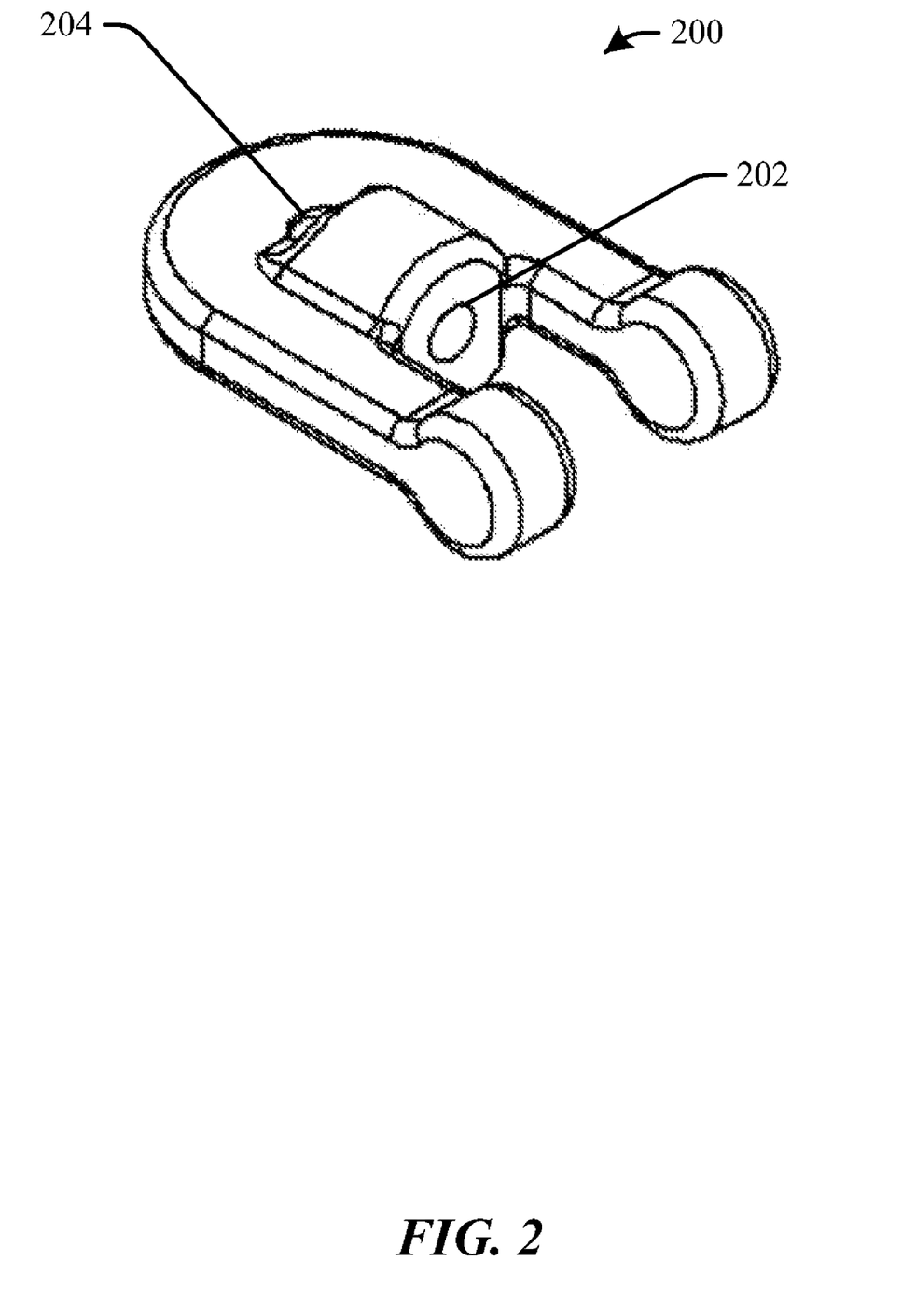
FIG. 2 illustrates a perspective view of a damper weight in accordance with an aspect of the innovation.

As illustrated in FIG. 2, a perspective view of a damper weight 200 for use in the presently claimed damper assembly staking system is shown. The damper weight 200 includes a forked side which accepts a messenger (not shown). The damper weights 200 produce bending of the messenger, which causes the individual wires (not shown) of the messenger to rub together, thus dissipating energy.

A messenger hole 202 is drilled in the forked side of the damper weight 200. The messenger hole 202 is sized to accept the messenger, which is typically 7.8 mm in diameter. A staking hole 204 is then drilled into the bottom of the damper weight 200. The staking hole 204 extends just beyond the far side of the messenger hole 202 and is sized to receive a staking ball (not shown). Extending the staking hole 204 past the bottom edge of the messenger hole 202 allows the messenger to distort into the staking hole 204 when the staking ball exerts a force on the messenger. This distortion increases the frictional force, thus securely attaching the damper weights to the messenger.

The staking hole 204 and the staking ball are effectively the same size. Typically, both the size of the staking ball and the staking hole 204 increases as the size of the weight 200 increases. In accordance with this particular example, the staking hole 204 is located 0.625 inches from the inner edge of the forked side of the damper weight 200. Staking of the damper weight 200 is accomplished by pressing the staking ball into the staking hole 204 to secure the messenger within the damper weight 200. The effect of using a force to insert the staking ball causes distortion of both the staking ball and the messenger. This distortion increases the frictional forces, thus securely attaching the damper weights 200 to the messenger.

Figure 3:
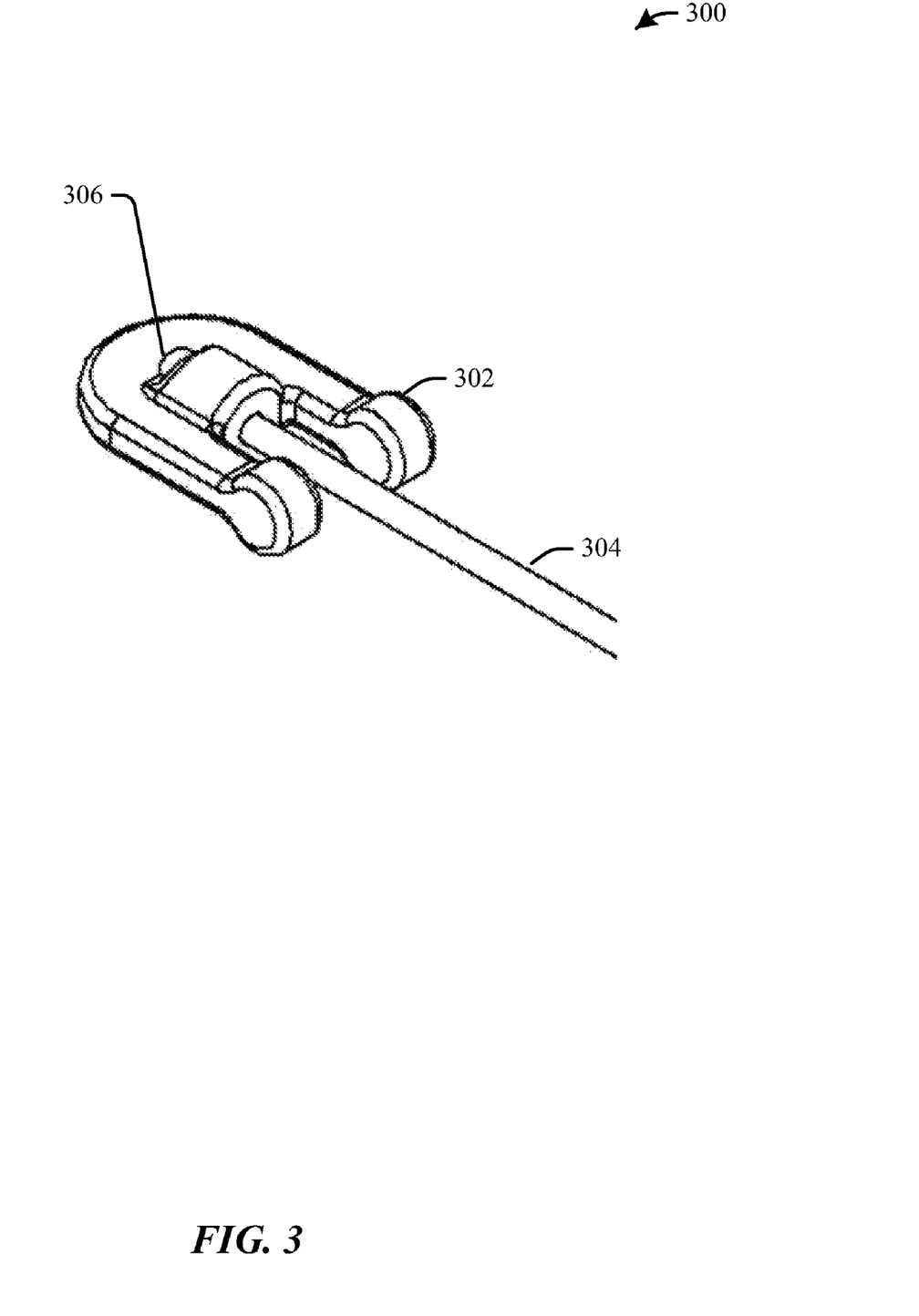
FIG. 3 illustrates a perspective view of a partial damper assembly in accordance with an aspect of the innovation.

As illustrated in FIG. 3, a perspective view of a partial damper assembly 300 for use in the subject claimed damper assembly staking system is shown. The damper assembly 300 includes a damper weight 302, a messenger 304 and a staking ball 306. The damper weight 302 produce bending of the messenger 304, which causes the individual wires (not shown) of the messenger 304 to rub together, thus dissipating energy. The staking ball 306 secures the messenger 304 within the damper weight 302.

Specifically, the damper weight 302 includes a forked side which accepts a messenger 304. A messenger hole is drilled in the forked side of the damper weight 302. The messenger hole is sized to accept the messenger 304. A staking hole is then drilled into the bottom of the damper weight 302. The staking hole extends just past the bottom edge of the messenger hole and is sized to receive a staking ball 306. Extending the staking hole past the bottom edge of the messenger hole allows the messenger 304 to distort into the staking hole when the staking ball 306 exerts a force on the messenger 304. This distortion increases the frictional force, thus securely attaching the damper weights 302 to the messenger 304. The staking ball 306 also causes the individual wires (not shown) of the messenger 304 to open from their formed helix creating additional frictional forces.

In an aspect, the staking hole is located 0.625 inches from the inner edge of the forked side of the damper weight 302. Typically, the staking hole is slightly larger than the staking ball 306. The staking ball 306 is comprised of brass, but may be comprised of any suitable material that can be compressed with the messenger 304, such as aluminum and other alloys. The composition of the staking ball 306 depends on corrosion, ductility and strength in securing the messenger 304. The material selected for the staking ball 306 is critical to providing the ability of the staking ball to distort yet have the strength to restrain the messenger 304.

Staking of the damper weight 302 is accomplished by pressing the staking ball 306 into the staking hole to secure the messenger 304 within the damper weight 302. The example staking ball 306 is pressed in with a 0.310 hardened dowel pin (not shown) that has a concave end to hold and align the staking ball 306 for insertion. In an aspect that employs a brass staking ball, the staking ball 306 and the messenger 304 are compressed together at a force of 12,000 to 15,000 pounds to secure the messenger 304 within the damper weight 302. The compression force varies, depending on the size of the staking ball 306, the staking ball material and user specifications.

Figure 4:
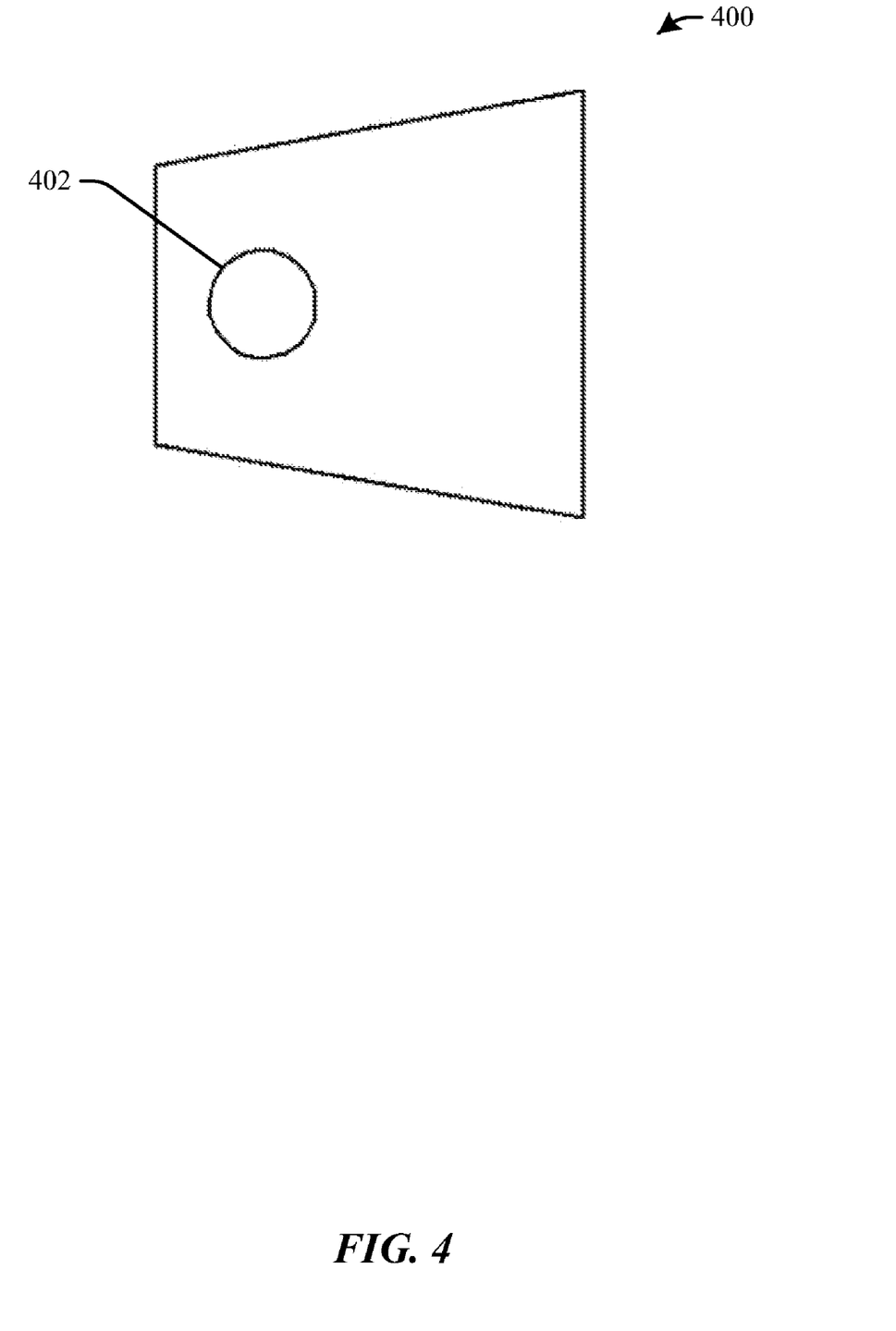
FIG. 4 illustrates a top view of the collet plug for a re-worked damper weight in accordance with an aspect of the innovation.

Furthermore, damper weights now in use can be re-worked to utilize the subject claimed damper assembly staking system. The re-worked damper weights comprise a collet hole for accepting a collet. The collet encompasses the end of a messenger and is then crimped into place. As shown in FIG. 4, the collet hole of the re-worked damper weights would be filled in via a collet plug 400. A messenger hole (not shown) for accepting the messenger would then be drilled into the collet plug 400. The depth of the messenger hole would match the collet's depth. A staking hole 402 is then added to accept the staking ball (not shown). The staking hole 402 extends just past the lower edge of the messenger hole and is sized to receive the staking ball. Staking of the damper weights is accomplished by pressing the staking ball into the staking hole 402 via a hardened dowel pin (not shown) that has a modified concave end to hold and align the staking ball for insertion. As described above, in the case of a brass staking ball, the staking ball and the messenger are compressed together at a force of 12,000 to 15,000 pounds to secure the messenger within the re-worked damper weights. Thus, re-worked damper weights can be utilized with the present damper assembly staking system without making changes to the messenger, clamps or weight placements.

Figure 5:
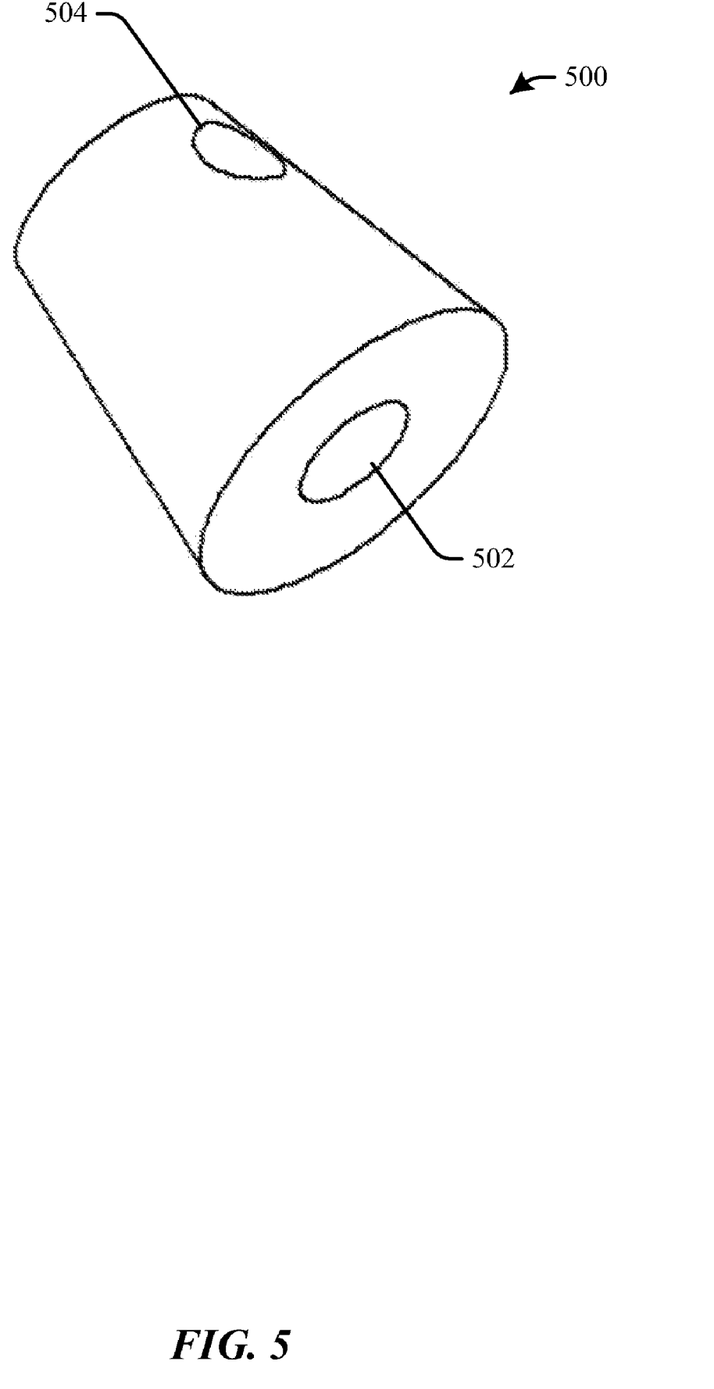
FIG. 5 illustrates a perspective view of the collet plug for a re-worked damper weight in accordance with an aspect of the innovation.

FIG. 5 is a perspective end view of a collet plug 500 for filling in the collet hole of a re-worked damper weight. This view shows the collet plug 500 in greater detail. As shown in FIG. 5, the messenger hole 502 is drilled out and a staking hole 504 is added at the top of the collet plug 500. The plug 500 is inserted into the collet hole of the re-worked damper weight (not shown). Then, in a specific embodiment, a messenger hole 502 is drilled out to the current 7.8 mm messenger size and depth of the current collet hole. A staking hole 504 is then drilled into the re-worked damper weight and the collet plug 500. The staking hole 504 extends just past the bottom edge of the messenger hole 502. Once the staking hole 504 is drilled to the correct depth, a messenger is then inserted into the messenger hole 502 and a staking ball is inserted into the staking hole 504. The staking ball and the messenger are compressed together via a hardened dowel pin (or similar device) to secure the messenger within the re-worked damper weight.

Figure 6:
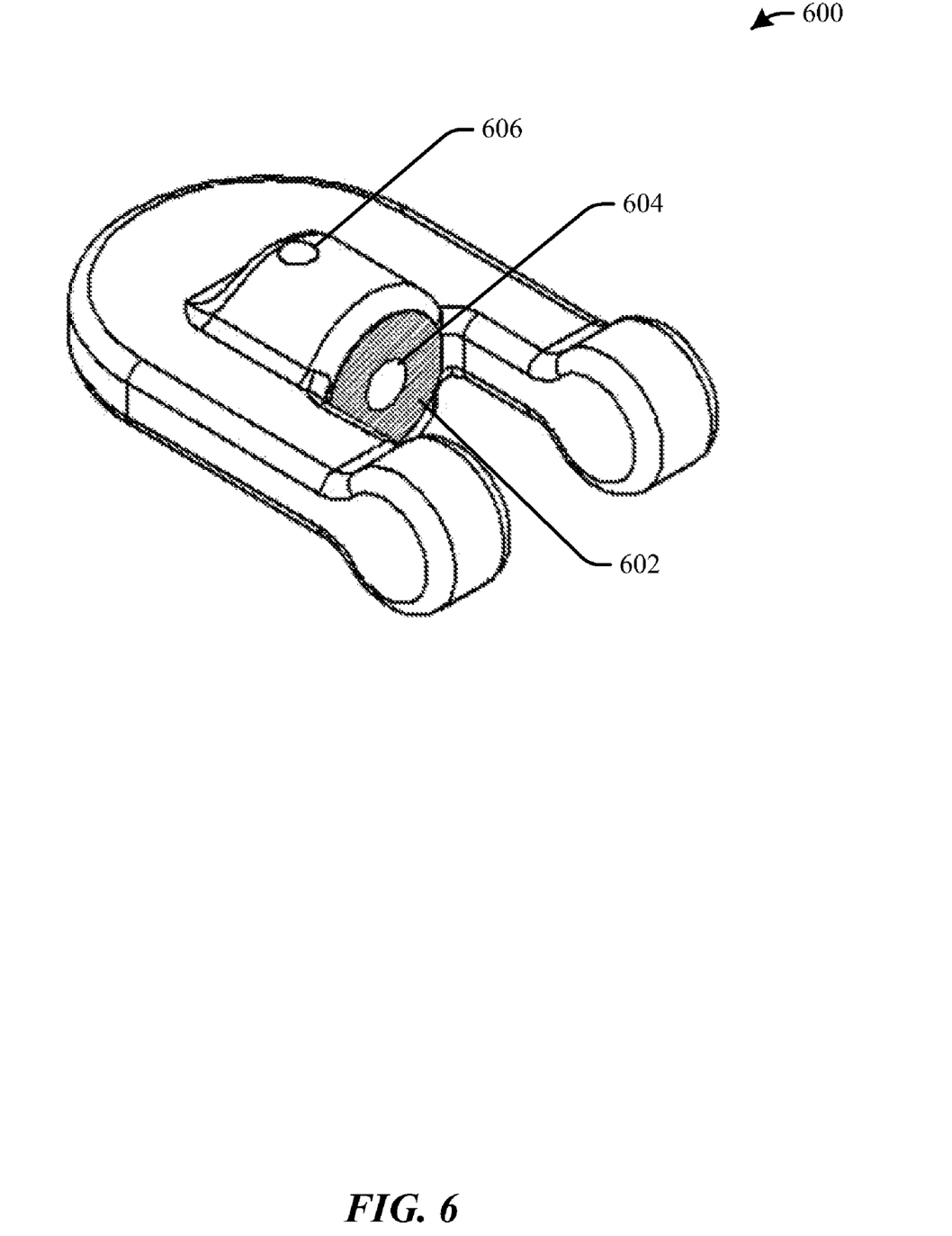
FIG. 6 illustrates a perspective view of a partial damper assembly with the collet plug in accordance with an aspect of the innovation.

FIG. 6 is a perspective view of an example re-worked damper weight 600 including the collet plug 602 for use in the presently claimed damper assembly staking system. The re-worked damper weight 600 includes a forked side which contains the collet plug 602. The collet plug 602 is inserted into the collet hole of the re-worked damper weight 600. Then, a messenger hole 604 is drilled out to the current 7.8 mm messenger size and depth of the current collet hole. A staking hole 606 is then drilled into the re-worked damper weight 600 and the collet plug 602. The staking hole 606 extends just past the lower edge of the messenger hole 604. Typically, the staking hole 606 is slightly larger than the staking ball. In this example, the staking hole 606 is located 0.625 inches from the lower edge of the forked side of the re-worked damper weight 600.

Staking of the re-worked damper weight 600 can be accomplished by pressing the staking ball into the staking hole 606 via a hardened dowel pin (not shown) that has a concave end to hold and align the staking ball for insertion. The staking ball and the messenger are compressed together at a force of 12,000 to 15,000 pounds to secure the messenger within the re-worked damper weight 600. Furthermore, in order to retain the same weight of the original damper assembly, 42 grams of metal needs to be removed from the end of the re-worked damper weight 600. This is done by removing 0.125 inches of material from the top and bottom of the sides of the re-worked damper weight 600. Thus, re-worked damper weights can be utilized with the present damper assembly staking system without making any changes to the messenger, clamps or weight placements.

Figure 7:
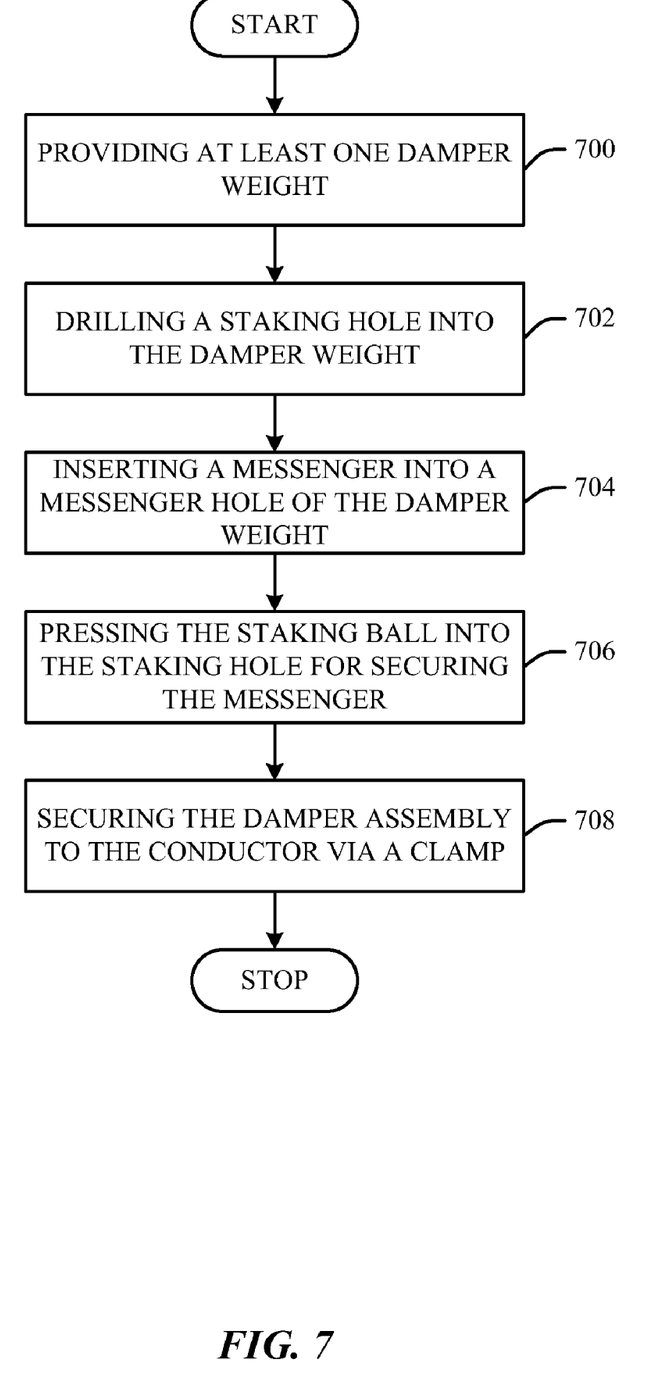
FIG. 7 illustrates a flowchart showing a method of staking damper weights onto a messenger in accordance with an aspect of the innovation.
Figure 8:
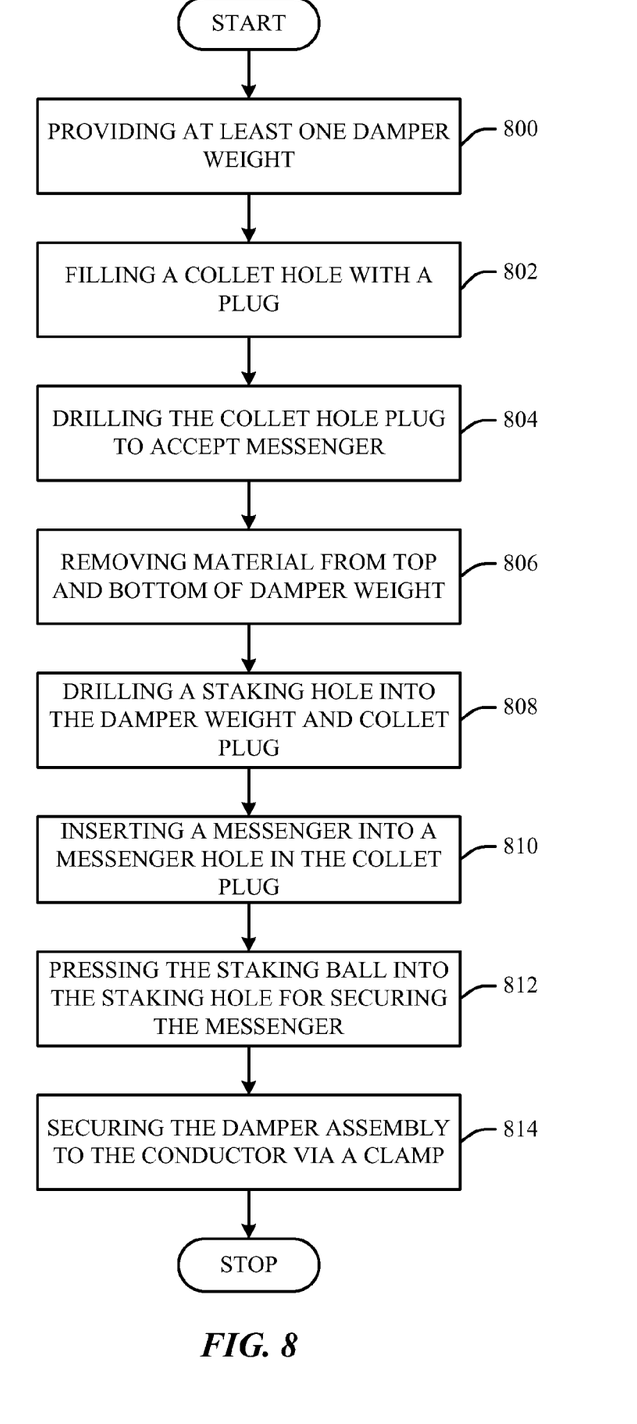
FIG. 8 illustrates a flowchart showing a method of staking re-worked damper weights onto a messenger in accordance with an aspect of the innovation.

FIGS. 7-8 illustrate methodologies of staking damper weights onto a messenger, according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring to FIG. 7, a method of staking damper weights onto a messenger is illustrated. At 700, at least one damper weight is provided. Typically, there can be at least two sizes of damper weights, large and small. Large damper weights provide damping at lower frequencies and small damper weights provide damping at higher frequencies. Most often, the damper weights are typically made of galvanized ductile iron casting, but can be made of any suitable material known in the art. The damper weights comprise a forked side which accepts a messenger via a messenger hole. At 702, a staking hole is drilled directly into the damper weight. The staking hole extends just past the bottom edge of the messenger hole and is sized to receive a staking ball. Typically, the staking hole is slightly larger than the staking ball. Further, the staking hole is located 0.625 inches from the lower edge of the forked side of the damper weights.

At 704, a messenger is inserted into the messenger hole of the least one damper weight. The messenger is made of formed hard steel wires that are galvanized for corrosion resistance. However, the messenger can also be coated with a mischmetal coating or a bezinal coating as opposed to galvanization. It is thus to be understood that any suitable material is contemplated and intended to fall under the scope of the hereto-appended claims. Vibrations from the conductor/cable react with the damper weight to produce bending of the messenger. The bending of the messenger causes the individual wires of the messenger to rub together, thus dissipating energy. The conductor is typically an aluminum based conductor such as ACSR (Aluminum Conductor, Steel Reinforced), AAC (All Aluminum Conductor), AAAC (All Aluminum Alloy Conductor), ACAR (Aluminum Conductor, Aluminum Reinforced), etc. However, other conductors/cables can be used. It is thus to be understood that any suitable conductors/cables are contemplated and intended to fall under the scope of the hereto-appended claims.

At 706, a staking ball (e.g., brass ball) is pressed into the staking hole for securing the messenger within the damper weight. The staking ball is comprised of brass, but may be comprised of any suitable material that can be compressed with the messenger, such as aluminum and other alloys. The composition of the staking ball depends on corrosion, ductility and strength in securing the messenger.

Staking of the damper weights is accomplished by pressing the staking ball into the staking hole via a hardened dowel pin that has a concave end to hold and align the staking ball for insertion. When a brass ball is employed, the staking ball and the messenger are compressed together at a force of 12,000 to 15,000 pounds to secure the messenger within the damper weight. The compression force varies, depending on the size of the staking ball, the staking ball material and user specifications. And at 708, the damper assembly is secured to the conductor/cable via a clamp. The clamp can have an extruded hook shaped profile which hangs on the conductor and a keeper which tightens and secures the conductor. Or, the clamp can have two semi-circular halves which tighten and secure the conductor, etc. Thus, the clamp captures and holds the damper assembly firmly onto the conductor/cable.

Referring to FIG. 8, an example method of staking re-worked damper weights onto a messenger is illustrated. At 800, at least one re-worked damper weight is provided. The re-worked damper weights comprise a forked side with a collet hole. At 802, the collet hole is filled. Typically, the collet hole is filled with a collet plug as shown in FIGS. 4-5. At 804, the collet plug is drilled to accept a messenger. A messenger hole for accepting the messenger is drilled into the collet plug. Specifically, in one embodiment, the messenger hole is drilled out to the current 7.8 mm messenger size and depth of the current collet hole.

At 806, 0.125 inches of material is removed from the top and bottom of the re-worked damper weight. In order to retain the same weight of the original damper assembly, 42 grams of metal is to be removed from the top and bottom of the re-worked damper weight. This is done by removing 0.125 inches of material from the top and bottom of the sides of the re-worked damper weight. Thus, re-worked damper weights can be utilized with the present damper assembly staking method without making any changes to the messenger, clamps or weight placements.

At 808, a staking hole is drilled directly into the re-worked damper weight and through the collet plug. The staking hole extends just past the bottom edge of the messenger hole and is sized to receive a staking ball. Typically, the staking hole and the staking ball are the same diameter. Further, the staking hole is located 0.625 inches from the inner edge of the forked side of the re-worked damper weight.

At 810, a messenger is inserted into the messenger hole of the re-worked damper weight. The messenger is made of formed hard steel wires that are galvanized for corrosion resistance. At 812, a staking ball is pressed into the staking hole for securing the messenger within the re-worked damper weight. Staking of the re-worked damper weights is accomplished by pressing the staking ball into the staking hole via a hardened dowel pin that has a concave end to hold and align the staking ball for insertion. The staking ball and the messenger are compressed together at a force of 12,000 to 15,000 pounds to secure the messenger within the re-worked damper weight.

And at 814, the damper assembly is secured to the conductor/cable via a clamp. The clamp can have an extruded hook shaped profile which hangs on the conductor and a keeper which tightens and secures the conductor. Or, the clamp can have two semi-circular halves which tighten and secure the conductor, etc. Thus, the clamp captures and holds the damper assembly firmly onto the conductor/cable.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for staking damper weights onto a messenger, comprising:
   at least one damper weight;
   a messenger inserted into a messenger hole of the at least one damper weight, the messenger dissipates energy of a conductor;
   a clamp that secures the messenger to the conductor;
   a staking hole positioned at bottom of the at least one damper weight, the staking hole extends just past a side of the messenger hole; and
   a staking ball pressed into the staking hole, the staking ball distorts and secures the messenger within the at least one damper weight, wherein the distortion increases friction between the at least one damper weight and the messenger.

2. The system of claim 1, wherein the staking ball is pressed into the staking hole with a dowel pin that has a concave end for holding and aligning the staking ball.

3. The system of claim 1, wherein the staking ball is pressed into the staking hole compressing the staking ball and the messenger together at a force of 12,000 to 15,000 pounds and wherein the staking ball distorts between strands of the messenger.

4. The system of claim 1, wherein the staking ball is brass.

5. The system of claim 1, wherein both the staking ball and the staking hole are substantially the same size.

6. The system of claim 5, wherein the staking ball and the staking hole are 0.312 inches in diameter.

7. The system of claim 6, wherein the staking hole is located approximately 0.625 inches from an inner edge of a forked side of the at least one damper weight.

8. The system of claim 1, further comprising a collet hole that accepts a collet, the collet hole is located on a forked side of the at least one damper weight.

9. The system of claim 8, wherein the collet hole is filled and then drilled to accept the messenger.

10. The system of claim 9, wherein depth of the drilled hole matches the collet hole depth.

11. The system of claim 10, wherein approximately 0.125 inches of material from top and bottom of the at least one damper weight is removed.

12. A method for staking damper weights onto a messenger, comprising:
   providing at least one damper weight;
   inserting a messenger into a messenger hole of the at least one damper weight, the messenger dissipates energy of a conductor;
   securing the messenger to the conductor via a clamp;
   drilling a staking hole at bottom of the at least one damper weight, the staking hole extends just past a bottom edge of the messenger hole;
   pressing a staking ball into the staking hole via a dowel pin, wherein the dowel pin has a concave end for holding and aligning the staking ball; and
   distorting the staking ball and the messenger, wherein the distortion increases friction and secures the messenger within the at least one damper weight.

13. The method of claim 12, wherein the messenger has a plurality of wires that open from a formed helix creating additional friction when the staking ball is pressed into the staking hole.

14. The method of claim 12, further comprising filling a collet hole located on a forked side of the at least one damper weight.

15. The method of claim 14, further comprising drilling a hole in the collet hole to accept the messenger.

16. The method of claim 15, wherein depth of the drilled hole matches the collet hole depth.

17. The method of claim 12, further comprising removing approximately 0.125 inches of material from top and bottom of the at least one damper weight.

18. The method of claim 12, wherein the clamp is at least one of forged, casted, extruded and injection molded.

19. The method of claim 12, wherein the messenger is formed of hard steel wires that are at least one of galvanized, coated with a mischmetal coating and coated with a bezinal coating.

* * * * *